Oct. 6, 1959 — H. H. DASEY — 2,907,122

CHEMICAL PROCESS LAYOUT

Filed March 6, 1957

INVENTOR
HOMER H. DASEY.
BY
William J. Ruano
ATTORNEY.

United States Patent Office 2,907,122
Patented Oct. 6, 1959

2,907,122

CHEMICAL PROCESS LAYOUT

Homer H. Dasey, Oakmont, Pa., assignor to "Visual" Plant Layouts Inc., Oakmont, Pa.

Application March 6, 1957, Serial No. 644,348

1 Claim. (Cl. 35—16)

This invention relates to a plant layout system and, more specifically, to a three-dimensional system involving miniature models.

Heretofore, industrial plant layouts have been simplified by using miniature models in a single plane for giving a better picture as to the layout of machines and other equipment on a floor.

However, an outstanding disadvantage of such systems is that it does not take into account vertical positioning of the machines and other equipment, in space, or the problem of clearances between pipes or cross-over connections or the like such as used in inter-connecting chemical processing tanks or similar devices.

An object of my invention is to provide a miniature plant layout system in three dimensions so as to overcome the above mentioned disadvantages and so as to permit planning in three dimensions, instead of two.

A further and specific object of my invention is to provide a plant layout system which is particularly useful for chemical plant layouts and embodying the use of miniature models which can be suspended vertically by rods in any desired position, in space, and which can be interconnected with rods representing piping or other connections, and which involves an efficient means for determining pipe clearances in cases of pipe cross-overs and the like.

A further object of the invention is to provide a three-dimensional plant layout system wherein the parts when assembled, may be photographed in association with calibrations in a manner so that their exact position in space in three dimensions may be visually observed.

Figure 1:
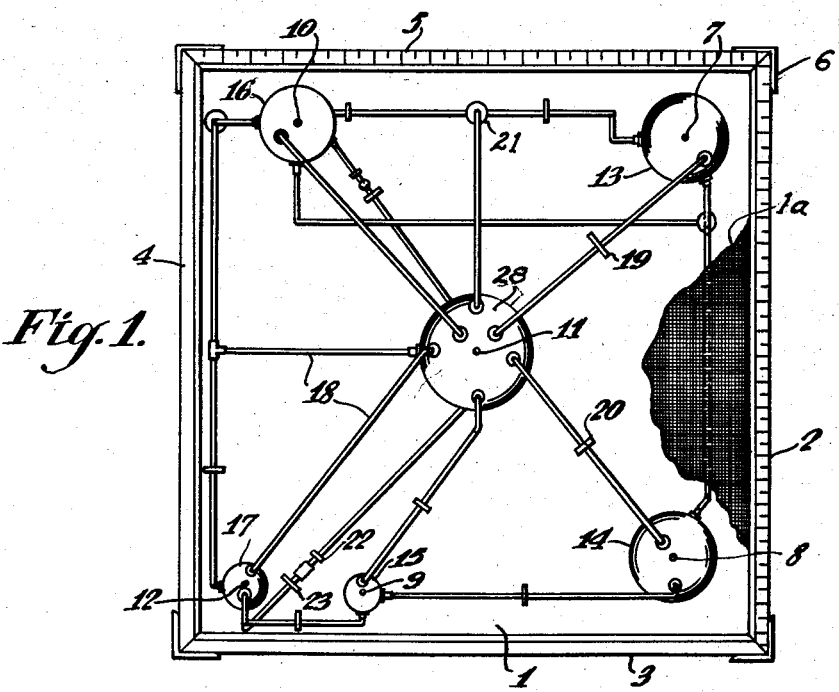
Figure 2:
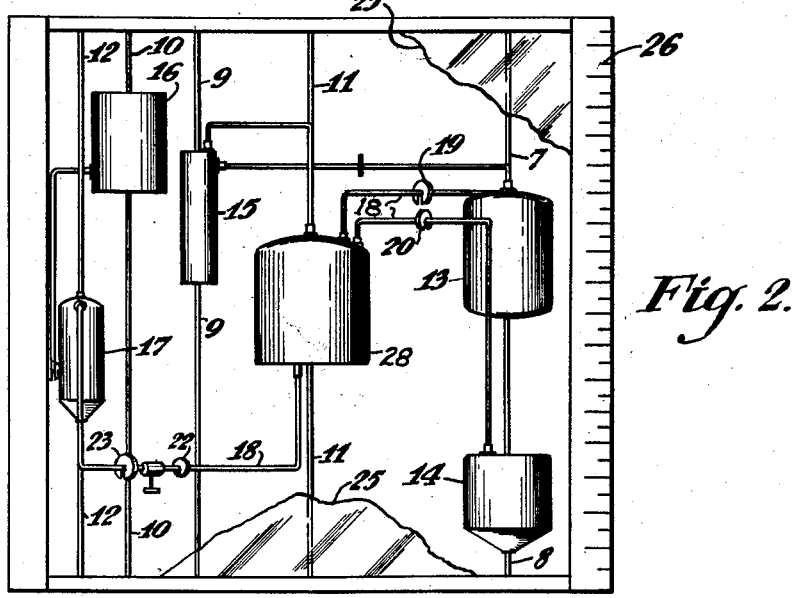

Other objects and advantages of my invention will become more apparent from a study of the following description taken with the accompanying drawing wherein:

Figure 1 is a top view of a three dimensional planning cube representing a chemical process layout and involving the principles of my invention, with parts of the top screen shown broken away to more clearly illustrate the system, and Figure 2 is a front elevational view of the planning cube shown in Fig. 1, showing only fragmentary parts of the transparent front screen.

Referring more particularly to the drawing, numeral 1 denotes a bottom screen of fine gauge material, such as aluminum or other suitable material, which is mounted on a frame, preferably also of aluminum, having four sides 2, 3, 4 and 5. Sides 2 and 5 are shown with suitable scales or calibrations, although it should be understood that the remaining two sides may be similarly calibrated. To denote the positions of the parts in a horizontal plane, there are two screens and frames, one at the bottom and one at the top of the cube, only a fragmentary portion 1a of the top screen being shown. The screens are preferably made of thin gage metal with a sufficiently open mesh that photographs may be taken through the top and bottom screens to reveal the miniature models and interconnecting rods. The top and bottom screens are interconnected, vertically, by corner angle posts 6 at each of the four corners. The interior surfaces of such angle posts may also be calibrated vertically so that photographs taken from the front or rear of the cube may reveal the vertical scale on these posts, which, taken together with the outer vertical scales on opposite sides, such as 26, shown in Fig. 2 would give an accurate indication of the exact vertical position of any part within the cube.

A highly important advantage obtained by the use of the top and bottom screens and frames is that the screens provide grids in two vertically spaced horizontal planes which enable exact determination of the position, in space of any part within the cube by exactly determining the positions of the top and bottom ends of their supporting rods. More specifically, hanger rods, such as 7, 8, 9, 10, 11 and 12, may be projected through the mesh openings in the top and bottom screens to exactly position the vertical center lines of tanks or other objects represented by the three dimensional model 13, 14, 15, 16, 17 and 28, respectively. Although not shown, the screens may likewise be calibrated in the horizontal and vertical directions in the plane of the drawing by painting or otherwise indicating marks on the wires thereof so as to even more readily facilitate the exact positioning of the vertical hanger rods 7 etc. and to visually determine the positions in space of the parts of the system. These hanger rods may be made of one sixteenth inch diameter brass and may be provided with hooked tops so as to limit the downward movements of the rods.

It will be noted that hanger rods 7 to 12 inclusive are adapted to support tanks 13 to 17 and 28 inclusive by passing through the vertical axes of the tanks. These tanks may be made of any suitable light material, such as expandable polystyrene plastic, which weighs only fractions of an ounce. Preferably, each has a small brass tube mounted in the vertical or longitudinal axis which provides a guide for the corresponding hanger rod. The tanks, such as 13, 14 etc. are made to scale so that they will accurately represent the dimensions of the actual tanks in the chemical process layout. Thus, by means of the grid formations on the top and bottom screens, the vertical hanger rods 7 to 12 inclusive may be exactly positioned in space, particularly with the aid of calibrations on the screen frame as well as calibrations of the screen itself. Calibrations, such as 26, may be placed on all eight of the outside surfaces of the posts to facilitate the vertical positioning of the various tanks and other devices and to provide suitable scales to give a visual indication in three dimensions of any tank or other part of the system. Metal rods 18, also preferably of brass, are representative of the piping between the various tanks. T connections, such as 21, are also provided in miniature form and are drilled so that the rods may be fitted therein. Likewise metal nozzles may be screwed in the tanks or vessels in tapped holes formed in the desired positions so as to accept piping rod connections thereto.

A unique feature of the present invention resides in the manner of determining clearances between pipes represented by rods such as 18, or cross-over connections. Instead of making the rods 18 of different diameters to represent different diameters of actual pipes, rods 18 are all made of the same small diameter and are provided with pipe-size disc or plugs, such as 19, 20, 22 and 23, which are in the form of discs or cylinders which are each slotted along a radius so that the disc or plug may be slipped on and frictionally fitted on the rods 18 and slid longitudinally thereof. Such discs are made of various diameters, to represent the actual diameter of the particular pipe represented thereby. In order to determine the clearance between two adjacent pipes the discs, such as 19 and 20 on the respective pipes, are slid along the rods, such as 18, to see whether or not they will touch as the result of such sliding movement as shown more clearly in Fig. 2. Therefore, when the discs, such as 19 and 20, do not touch, that indicates that there is sufficient clearance between the two horizontal pipes represented by the corresponding rods. Of course, such discs may also be placed on horizontal, vertical or angularly disposed rods to determine clearances.

The front or sides of the cube may be either opened or covered with transparent plastic material or glass 25, such as shown in part only. A suitable type of calibration may also be impressed on such transparent covers if so desired. The desirable feature of calibrating not only the front but rear wall surface or sides of the cube is that by projecting imaginary lines between points on the scales of the front vertical plane and rear vertical plane the exact position of the tanks or other items may be determined or observed in space.

The planning cube is preferably formed and sold in the nature of a kit having the various parts indicated including the parts for making and assembling the cube.

Thus a manufacturer may assemble and rearrange his layout to suit himself as he goes along in the planning of his plant.

Thus it will be seen that I have provided an efficient, three dimensional planning system which is essentially in the form of a cube or other rectangular frame work, which includes top and bottom screens so as to accurately position objects supported by vertical rods projecting therethrough and which includes calibrations to enable exact positioning in a vertical direction, so that tanks or other parts may be accurately positioned in space and so their exact position may be visually observed by eye or photograph.

While I have illustrated and described a single specific embodiment of my invention, it will be understood that this is by way of illustration only, and that various changes and modifications may be made within the contemplation of my invention and within the scope of the following claim.

I claim:

A three dimensional plant layout system comprising a plurality of miniature three dimensional models interconnected by rods, and a plurality of disc-like elements slotted along their radius and snugly fitted and slidable on said rods and held thereon solely by gravity and friction and being of diameters corresponding to those of pipes represented by said rods, whereby clearance between the pipes may be assured by so positioning the rods that sliding of said disc-like elements along said rods will not result in contact between said elements.

References Cited in the file of this patent

UNITED STATES PATENTS

| | | |
|---|---|---|
| 574,605 | Hailes | Jan. 5, 1897 |
| 2,127,047 | Pinney | Aug. 16, 1938 |
| 2,284,458 | Van Antwerp | May 26, 1942 |
| 2,317,124 | Adams | Apr. 20, 1943 |
| 2,523,508 | Ledgett | Sept. 26, 1950 |
| 2,738,584 | Parker | Mar. 20, 1956 |